Figure 1:
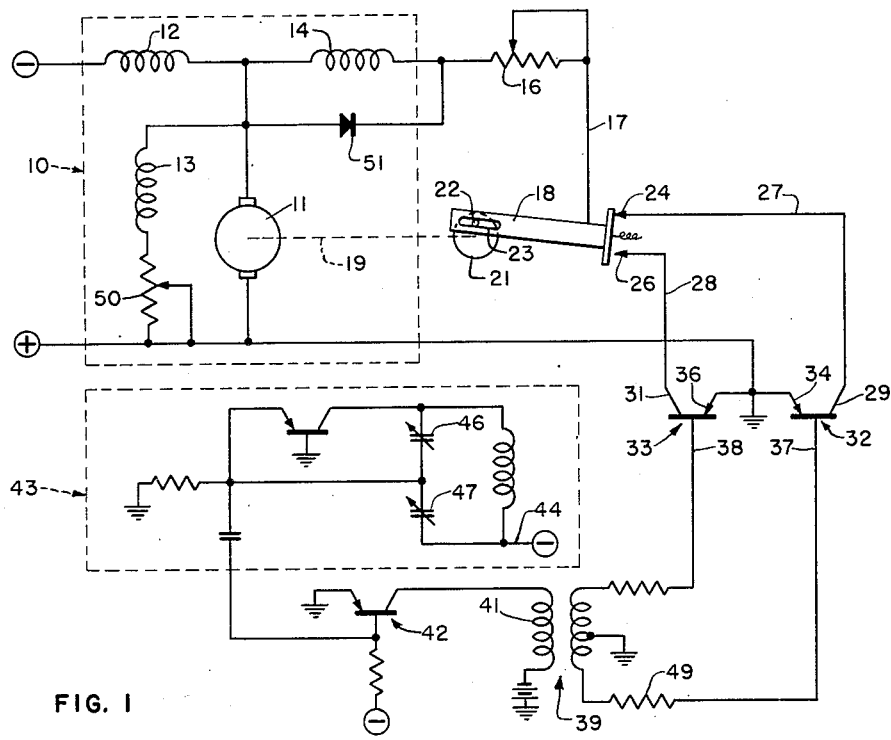

Jan. 15, 1957  T. A. HANSEN  2,777,979
MOTOR CONTROLLER
Filed Feb. 12 1954

INVENTOR
THEODORE A. HANSEN
BY *Emery Robinson*
ATTORNEY

United States Patent Office 2,777,979
Patented Jan. 15, 1957

2,777,979

MOTOR CONTROLLER

Theodore A. Hansen, Park Ridge, Ill., assignor to Teletype Corporation, Chicago, Ill., a corporation of Delaware Application February 12, 1954, Serial No. 409,864

7 Claims. (Cl. 318—314)

This invention relates to motor controllers and more particularly to motor controllers having means therein for comparing the angular velocity of a motor shaft with the output of a standard frequency pulse generator together with facilities for varying the speed of the motor upon the occurrence of any discrepancies between the angular velocity of the motor shaft and the frequency output of the generator.

Heretofore control circuits for motors employing electronic tubes with indirectly heated cathodes required considerable time for the tubes to warm up sufficiently to give consistent results, hence during the initial period of operation no reliable or consistent control was obtained. Recently a device called a transistor has been developed possessing many of the advantages of electronic tubes, however, the transistor presents many advantageous characteristics which are not obtainable through the use of the tubes. Among the advantageous characteristics of the transistor is the ability to be instantly placed in the operator condition upon the application of suitable operating potentials without the necessity of a preliminary warm up or conditioning period. Transistors can be operated on relatively low voltage such as encountered in the operation of small D. C. motors in use in the printing telegraph art. Thus, a single voltage source can be used to operate both the control circuit and the motor. Another feature of the transistor readily suiting it for use in a motor controller is the low impedance characteristic which may be matched against the low impedance characteristic of a D. C. motor field.

It is a primary object of the present invention to provide a motor controller utilizing the afore-enumerated advantageous characteristics of a transistor.

A further object of the invention resides in means for comparing the angular velocity of a motor shaft with an output of a constant frequency pulse generator and then varying the speed of the motor to compensate for any discrepancy between the angular velocity of the shaft and the output frequency of the generator.

Another object of the present invention is to provide a motor controller alternately utilizing a pair of transistors in the control circuit of the motor for the purpose of attaining rapid control of the speed characteristics of the motor.

A more specific object of the invention resides in a motor speed control system wherein the control is obtained by varying the period of energization of an auxiliary field winding of the motor through the agency of a contactor driven by the motor.

With these and other objects in view the present invention contemplates a D. C. motor having an auxiliary field winding for controlling the speed of the motor. The motor drives a contactor to alternately connect the auxiliary field winding to separate ones of a pair of transistors. The base circuits of each transistor has applied thereto the output of a constant frequency oscillator to alternately render the transistor conductive during a portion of the period that the transistors are connected to the auxiliary field winding by the closure of the contactor. The mechanical and electrical components of the motor controller are so arranged that the contactor will connect the auxiliary field winding to the transistor when the base potential of the transistor is at a maximum negative value, consequently rendering the transistor instantly conductive. The output of the oscillator is such that the base potential gradually rises and before the contactor has opened the transistor is rendered nonconductive. Upon the occurrence of any discrepancy between the frequency of closure of the contactor and the frequency output of the oscillator, the period of conduction of each transistor will be accordingly varied to return the motor to a predetermined rated speed.

More specifically, since the motor speeds up, the transistors will be rendered conductive for a greater period of time and manifestly the current flowing in the auxiliary field winding flows for a greater period of time to aid the main field windings to slow the motor down. In the situation where the motor slows down, the period in which the transistor is rendered conductive also is decreased thereby providing pulses of shorter duration to the auxiliary field winding and as a result the effect of this auxiliary field winding is decreased and the motor will speed up.

Figure 2:
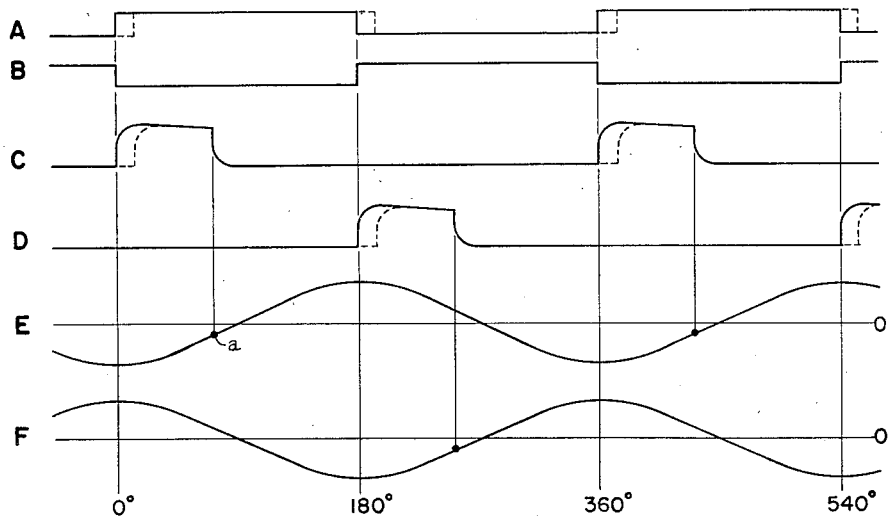

Other objects and advantages of the present invention will be apparent from the following detailed description when considered in conjunction with the accompanying drawings wherein:

Fig. 1 is a circuit diagram of a motor controller illustrating the principal circuit components employed in practicing one embodiment of the invention; and Fig. 2 is a timing diagram showing the relationship of various circuit conditions with respect to degrees of rotation of the motor shaft.

Referring to Fig. 1 there is illustrated a compound wound direct current motor 10 having an armature 11, a series winding 12, and a shunt winding 13. Motor 10 is also provided with an auxiliary control field winding 14 adapted to aid the shunt field winding 13 upon the passage of current therethrough. Field winding 14 is connected through a suitable rheostat 16, over a lead 17, to a pivotally mounted contactor 18. A motor shaft 19 drives a disc 21 having a pin 22 mounted in the vicinity of the periphery thereof. The pin 22 fits within a slot 23 formed in the contactor 18 and is adapted to oscillate the contactor to alternately move into engagement with a pair of fixed contacts 24 and 26. Contacts 24 and 26 are connected over a pair of leads 27 and 28 respectively to a pair of collectors 29 and 31 of two transistors 32 and 33.

The transistors 32 and 33 are PNP junction type transistors of the type described in the patent to Shockley No. 2,569,347 dated September 25, 1951. These transistors have respective emitters 34 and 36 connected to ground and the bases 37 and 38 thereof are connected through suitable current limiting resistance elements to the lower and upper terminals of a secondary of a grounded center tap transformer 39.

The transformer 39 has its primary winding 41 connected to the collector of a transistor amplifier 42. The base of this transistor is controlled by an oscillator shown within the dash lines and generally designated by the reference numeral 43. This oscillator is of the general type shown in the patent to L. A. Meacham No. 2,556,286, dated June 12, 1951. Negative battery for supplying energy to the oscillator is applied over a lead 44 from a negative source which also applies negative battery for the operation of the motor 10. Oscillator 43 includes a pair of adjustable capacitances 46 and 47 adapted to set the period of oscillation thereof at some fixed frequency.

In operation of the motor controller system, the application of battery to the system causes the motor 10 to commence rotation and as a consequence the contactor 18 is oscillated so that for each 180° revolution of the motor shaft 19 one of said contacts 24 or 26 is in engagement with the contactor 18. For purposes of illustration assume that the contactor 18 engages the contact 24, as illustrated in Fig. 1, then a negative potential is applied through the windings 12 and 14, through a rheostat 16, over the lead 17, through the now closed contact pair 18—24, over the lead 27 to the collector 29 of the transistor 32. Both the transistors 32 and 33 possess the characteristic of being rendered conductive when their respective bases are driven negative with respect to their emitters.

Turning our attention now to the oscillator 43, it produces an alternating voltage output which is applied to operate the transistor amplifier 42 to produce an alternating voltage output in the primary 41 of the transformer 39. Provision of the transistor 42 permits power to be supplied the transformer 39 without affecting the stability of the oscillator circuit.

During each cycle of operation of the oscillator 43, the voltage induced in the secondary of the transformer 39 assumes a negative value of considerable magnitude to drive the base 37 of the transistor 32 sufficiently negative with respect to the emitter 34; manifestly, the transistor 32 is rendered conducting whereupon current is permitted to flow in the winding 14 to control the speed of the motor.

Normally the motor runs as a conventional compound motor so that the speed characteristic is essentially flat without the influence of the control field 14. A shunt field rheostat 50 is adjusted so that the regulated speed is attained when the control field 14 is energized for approximately 50% of the time as shown graphically in lines C and D of Fig. 2. Thus it will be seen that the control field is required to supply only the differential field power necessary to compensate for load and voltage changes.

When the contactor 18 moves from the contact 24 into engagement with the contact 26, the winding 14 is thereby connected to the collector 31. Again when the oscillator 43 causes the induction of a negative voltage of sufficient magnitude in the secondary of the transformer 39, the base 38 is driven negative with respect to the grounded emitter 36. The transistor 33 is thereupon rendered conducting and current again flows through the winding 14 to aid the shunt winding 13 to regulate the speed of the motor 10.

The frequency of operation of the oscillator 43, is selected or adjusted to produce (during one complete cycle) two negative impulses in the secondary of the transformer 39 for each complete revolution of the motor shaft 19 when said motor is rotating at the desired rated speed. One of said negaitve going impulses is applied to the base 37 whereas the other is impressed on the base 38. When one of said bases has impressed thereon a negative potential, the other base has applied thereto a positive potential which holds this transistor in its cut off condition.

Referring to Fig. 2 wherein the voltage applied to the base 37 is depicted by the reference letter E, it may be observed that when this voltage assumes its maximum negative value, the contactor 18 engages the contact 24 which condition is denoted in Fig. 2 by the line designated A. Inasmuch as closure of this contact pair applies a negative potential to the collector 29 and the base 37 has also applied thereto a negative potential, which delivers a normal bias current through a limiting resistor 49, then the transistor 32 is instantly rendered conducting and current flows through the control winding 14 to regulate the speed of the motor. Transistor 32 is maintained in its conductive state until the potential on the base 37 rises to a value indicated by the letter $a$ on wave form E whereupon the difference in potential between the emitter and the base is insufficient to maintain the transistor 32 in the conductive state. The magnitude and duration of the current flowing through the field winding 14 is shown by the wave form designated C in Fig. 2.

In a like manner the operation of the control circuit may be analyzed when the contactor 18 engages the contact 26; the wave forms B, D and F in Fig. 2 illustrate the various operating conditions of the contact pair 18—26, the current in the collector 31, and the potential applied to the base 38.

In the situation where the motor changes speed, a change in relationship is encountered between the time of contactor 18 opening and closing with respect to the generation of the voltage pulses by the oscillator 43. If the motor slows down the contactor 18 engages the contact 24 at a time when the potential (see wave form E) applied to the base 37 is past its maximum negative value and as a result the transistor 32 is rendered conducting for a shorter period of time. Obviously the duration of current flow in the control winding 14 is curtailed and the total current drawn by the armature 11 of the motor 10 increases to permit the motor to speed up. Also since the shunt field winding 13 does not have the prolonged aiding effect of the control field winding, the shunt field is incapable of holding the speed of the motor down. This analysis can be carried over in a consideration of the operation of the transistor 33 which will also be rendered conducting for a shorter period of time. The shorter periods of energization of the transistors 32 and 33 will continue until the motor again attains the rated speed. In Fig. 2 the changed relationship between the opening of the contacts and the wave forms of the potentials applied to the bases together with the shorter periods of current flow in the emitter circuits are illustrated by the dashed lines.

When the motor runs faster than the rated speed, the contactor 18 will engage the contact 24 before the maximum negative potential is applied to the base of the transistor 32 but at a point in the wave form wherein the applied potential is of sufficient negative magnitude to render the transistor 32 conducting. It may be therefore appreciated that transistor 32 will be rendered conducting for a longer period of time during each cycle of operation. In a like manner transistor 33 will also be rendered conductive for a longer period of time than will be the case when the motor is operating at rated speed. Current flow through the control field 14 then takes place for a greater period of time thereby cutting down the amount of current flowing in the armature 11 of the motor 10, whereupon the motor slows down until the rated speed is again attained.

A varistor 51 across control field winding 14 short circuits high voltage transients generated when a transistor 32 or 33 opens the field circuit.

Attention is directed to the oscillator 43 wherein a pair of adjustable capacitances 46 and 47 are provided. When an adjustment of these capacitances is effected to increase the capacitance thereof, the frequency output of the oscillator drops which is initially accompanied by an increased period of operation of the transistors 32 and 33 to cause the motor to slow down. When the motor slows down to coincide with the frequency of the oscillator, then the period of operation of the transistors 32 and 33 will be stabilized to maintain the speed of the motor. It is believed apparent that one will understand that a decrease in capacitance in the oscillator 43 will result in an increase in the frequency output of the oscillator 43 to accordingly effectuate an increase in the rated speed of operation of the motor 10. When adjustments are made of the capacitances, the rheostat 50 is also adjusted to insure that the transistors are rendered conductive for approximately ½ the time.

What is claimed is:

1. In a control system for a motor having an auxiliary field winding, a source of energy connected to said motor and to one terminus of said auxiliary field winding, a pair of transistors each having a base electrode, a collector electrode and a grounded emitter electrode, a single source of alternating potential connected to both said base electrodes for alternatively driving the base electrodes negative, means for adjusting the frequency of the alternating potential source to the desired period of rotation of the motor, and a contactor driven by the motor for alternately connecting the collectors to the other terminus of said field winding whereby the transistors are alternately energized to supply energy from the source to the field winding for periods of time dependent upon the magnitude of the applied base potential.

2. In a controller for a motor having auxiliary field windings, a source of energy connected to the motor and to one terminus of said auxiliary field winding, an oscillator for producing a sinusoidal voltage wave of a constant frequency, a pair of transistors having control base electrodes, means for applying said voltage wave to alternately drive said base electrodes negative, and means driven by the motor for alternately connecting said transistors to the other terminus of said field winding during periods when said bases are driven negative whereupon said transistors are alternately operated for periods dependent upon the initial time of connection to said winding and the magnitude of applied voltage, said period of operation for each transistor being longer when the period of rotation of the motor is less than the frequency of the oscillator.

3. In a control system for a direct current motor having an auxiliary field winding, a pair of transistor means having collectors and base control electrodes, means for cyclically and alternately applying operating potentials to said base electrodes, means for cyclically and alternately connecting each collector to said auxiliary field winding, and means for applying through said field winding and connecting means to said collectors a predetermined potential whereby the transistors are alternatively operated to permit current to flow through the auxiliary winding to control the speed of the motor.

4. In a control system as defined in claim 3 where the means for cyclically and alternately connecting the transistors to the auxiliary field winding are driven by a mechanism operated by the motor.

5. In a speed regulator for a direct current motor having an auxiliary field winding, a contactor unit connected to said auxiliary winding, a pair of contacts included in the contactor unit adapted to be alternately closed, a pair of transistor means, a collector electrode and base electrode connected to each transistor means, means connecting one collector electrode and a contact in parallel with the other collector electrode and other contact, means for applying a constant frequency sinusoidally varying potential to the base electrodes, means for driving said contactor unit to alternately close the contacts therein to alternately connect the transistors to the field winding, and means for applying a predetermined potential through said contactor unit to said collectors whereby said transistor means are alternately rendered conducting for periods of time determined by the duration of contact closure and the magnitude of the potential applied to the bases.

6. In a speed regulator as defined in claim 5 wherein means are provided for varying the frequency of the alternating potential to vary the period of conduction of the transistor means whereupon the speed of the motor is accordingly changed.

7. In a control device for a motor having an auxiliary field winding, a pair of normally nonconductive devices, a first and a second electrode for each of said devices which are adapted to render conductive the nonconductive devices when predetermined potentials are applied thereto; means for cyclically and alternately applying operating potentials to said first electrodes, means for cyclically and alternately connecting said second electrodes to said field winding, and means for applying through said field winding and said connecting means to said electrodes a predetermined potential whereby the devices are alternatively operated to permit current to flow through the auxiliary winding to control the speed of the motor.

References Cited in the file of this patent

UNITED STATES PATENTS

| 1,693,508 | Jenkins | Nov. 27, 1928 |
| 1,834,267 | Bonn | Dec. 1, 1931 |
| 2,546,783 | Roemke | Mar. 27, 1951 |

FOREIGN PATENTS

| 567,690 | Germany | Jan. 7, 1933 |